July 22, 1941. J. J. ETTINGER 2,250,417
FRACTURE REDUCTION AND RETENTION DEVICE
Filed Dec. 2, 1939 2 Sheets-Sheet 1
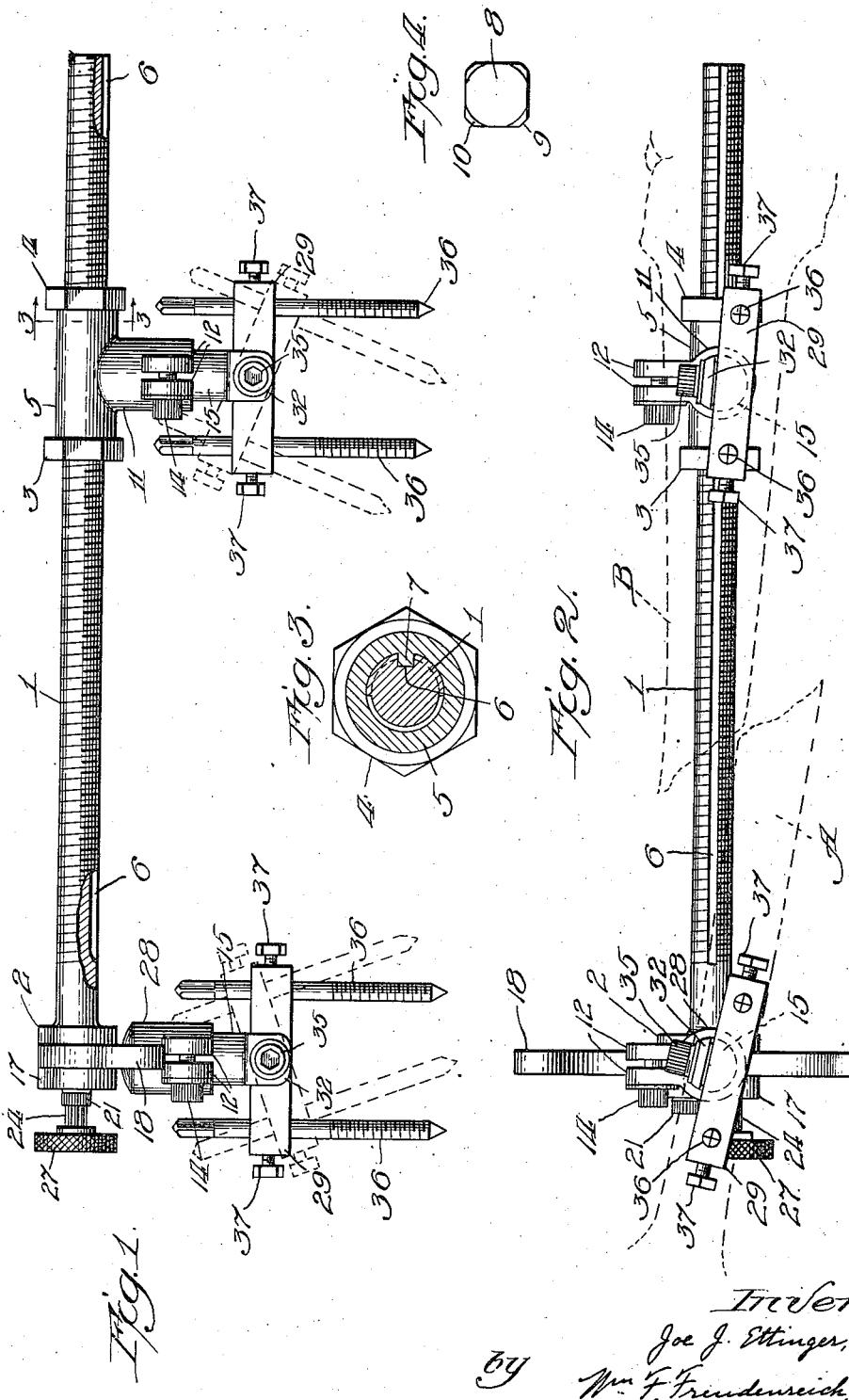

July 22, 1941.  J. J. ETTINGER  2,250,417
FRACTURE REDUCTION AND RETENTION DEVICE
Filed Dec. 2, 1939  2 Sheets-Sheet 2
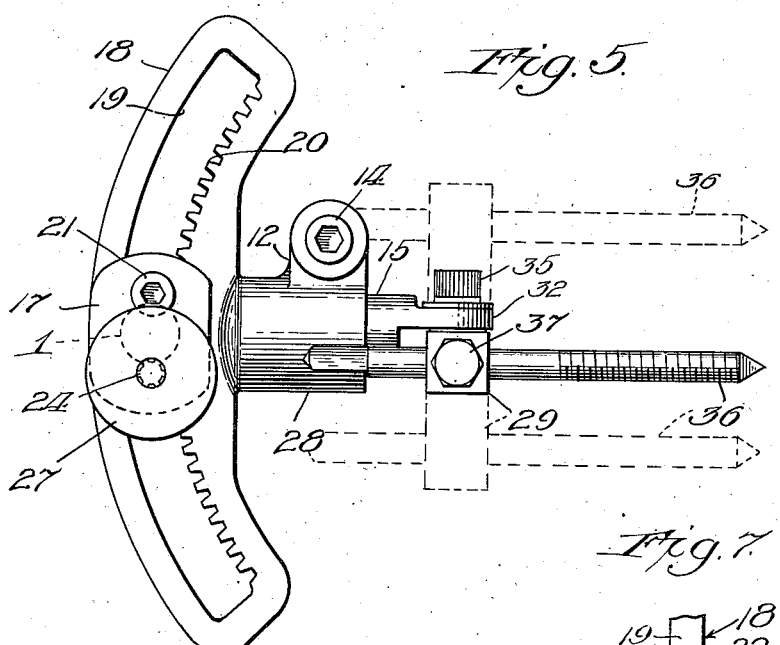
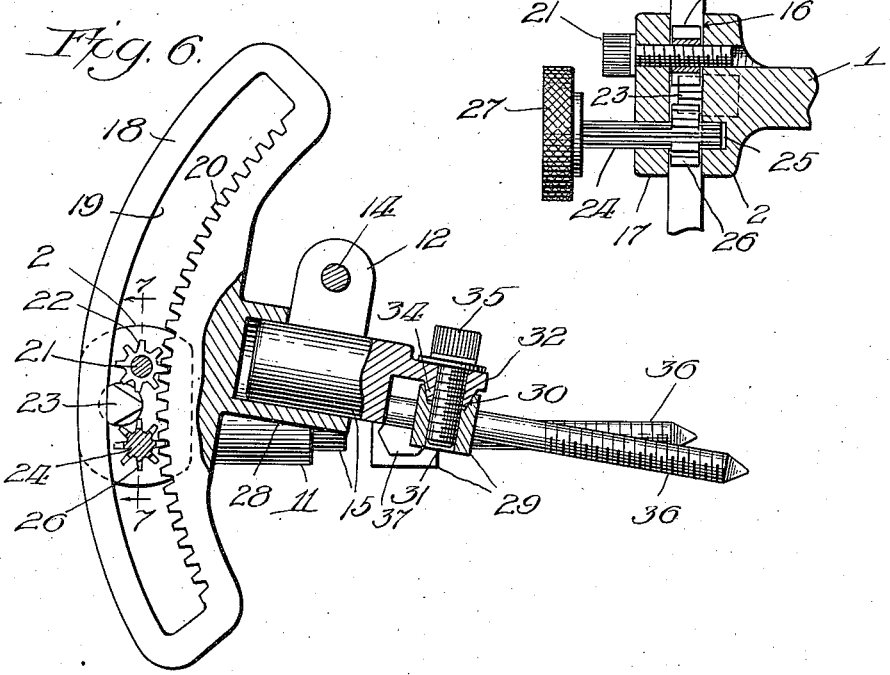
Inventor:
Joe J. Ettinger,
by Wm F Freudenreich,
Atty.

Patented July 22, 1941

2,250,417

UNITED STATES PATENT OFFICE 2,250,417

FRACTURE REDUCTION AND RETENTION DEVICE

Joe J. Ettinger, Warsaw, Ind., assignor to Zimmer Manufacturing Company, a corporation of Indiana Application December 2, 1939, Serial No. 307,192

14 Claims. (Cl. 128—92)

Apparatuses for the reduction of fractures of the long bones in the human body are usually heavy and massive, requiring that a cast be applied in order to free the arm or leg from equipment that is sufficiently heavy and bulky to prevent the arm or leg from being moved in a natural way. The primary object of the present invention is to produce a simple and novel fracture reduction device which possesses little weight or bulk, so as to make it entirely practicable to leave it in place and serve as a retention device, thereby making a cast unnecessary.

Since, in my improved device, provision must be made for angulation, rotation and extension, my invention may be said to have for its object to produce a simple, novel and efficient apparatus for accomplishing these ends.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a top plan view of a device embodying my invention in a preferred form, the bone-transfixing screws being shown in dotted lines as occupying different positions from the full line position; Fig. 2 is a front elevation of the device, illustrating conditions which exist at the time of attaching the device to the fractured bone shown in dotted lines; Fig. 3 is a section on line 3—3 of Fig. 1; Fig. 4 is an end view of a modified form of rod or bar; Fig. 5 is an end view, on a somewhat larger scale, showing the end which is at the left in Fig. 1; Fig. 6 is a view similar to Fig. 5, with parts shown in section, and one of the units for effecting skeletal attachment being illustrated as having been shifted angularly with respect to the bar or rod, from the position illustrated in Fig. 5; and Fig. 7 is a section on line 7—7 of Fig. 6.

Referring to the drawings, I represents a bar, rod or shaft having at one end a small head 2 on which is adapted to be mounted one unit for skeletal attachment, while another unit is adapted to be mounted on the bar, rod or shaft for movements along the same. In the arrangement shown, the bar is externally screw-threaded and is provided with two nuts 3 and 4 adapted to engage with opposite ends of a relatively small, sleeve-like part 5 which is slidable along the bar, which may be forcibly moved along the bar in one direction or the other by backing off one nut and screwing the other one ahead, and which may be held against rotation on the bar in any suitable way. In the main form illustrated, the bar is cylindrical and is provided with a longitudinal key-way 6 into which projects a projection or key 7 integral with or fixed to the member 5. In the arrangement shown in Fig. 4, the bar 8 has a cross section that is a square with the corners rounded as at 9; the rounded corners forming part of a circle whose center is at the center of the square. Thus, when a bar of this type is threaded, the threaded sections at the corners are separated from each other by flat faces. Therefore, if the part 5 have a square bore, it can slide along the bar, while the nuts can cooperate with the screw threads as devices to move the sleeve along the bar and to lock it in any position of adjustment.

Projecting radially from the part 5, to which I shall hereafter refer as a sleeve, is a tubular post 11 divided along one side and provided with ears 12 lying on opposite sides of the division line. A screw 14 extending loosely through one ear and into the other serves as a means to draw the ears together and thus contract the post. Fitting into the post is a round stem 15 which may be locked in any given position by the frictional grip of the post thereon, upon tightening the screw 14 but which, when the screw is loosened, may be removed from the post or be shifted lengthwise or angularly.

The end face 16 of the head 2 is flat and lies at right angles to the axis of the bar. Cooperating with the head is a thick, flat plate 17 of the same length and width as the head 2. Between the plate 17 and the rear face 16 of the head is a segmental member 18. Means are provided to shift this segmental member about its own axis which is one that is parallel with the bar 1 and is spaced apart therefrom. In the arrangement shown, the member 18 is in the form of a plate having a curved slot 19 extending throughout almost the entire length thereof; one of the long edges bounding the slot being provided with gear teeth 20. Extending through the plate 17 and through the slot 19, and screwed into the head 2 is a clamping screw 21 by means of which the member 18 may be held stationary. Loose on the screw 21, within the slot, is a small pinion 22 meshing with the gear teeth 20 that extends across substantially the full width of the slot. There is a short shaft 24 extending through the plate 17 and seated at its inner end in a socket 25 in the head 2. Projecting from the face 16 of the head 2, about midway between the pinions 22 and 26, but a little to one side of a line connecting the centers of the pinions, is a lug 23 which engages the plain long edge of the slot 19. Fixed to or forming part of this shaft is a pinion 26 similar to the pinion 22, while on the outer end thereof is a head 27 of considerable size adapted to be grasped to turn the shaft and thereby shift the member 18 angularly in one direction or the other. It will be seen that when it is desired to shift the member 18, the screw 21 need only be loosened to leave said member free to be moved by the pinion 26. Then, when the screw 21 is again tightened, the arc-shaped member is locked in place. The two pinions 22 and 26 and the lug 23 provide a three-point bearing for the member and serve to keep it from rocking except about the center of the arc upon which it is struck.

Projecting radially from the concave side of the segmental member 18 is a tubular post 28 similar to the post 11; this post having ears 12 with which is associated the clamping screw 14. A detachable stem 15 is adapted to be inserted in the post, being removable and adjustable angularly and lengthwise, and being adapted to be locked to the post by the frictional grip of the latter.

Associated with each of the two stems 15 is a short sturdy cross arm 29. Each cross arm has in one side thereof, at the middle, a frusto-conical socket 30 which merges into a screw-threaded bore 31 that continues out through the opposite side. Each stem 15 has at its outer end a flattened part 32 provided with a frusto-conical projection 34 complementary to the socket 30. A screw 35 extends through each of the flat members 32 at the axis of the frusto-conical projection, and into the screw-threaded bore 31 in the corresponding cross arm 29. When the screw 35 is tightened, the cross arm is locked to the stem. When the screw is loosened, the cross arm may be swung about the axis of the screw. In other words, each cross arm is capable of being shifted angularly about two axes at right angles to each other; and, in addition, the arm associated with the segmental member 18 may be swung bodily about an axis parallel to the main supporting bar 1 and at some distance therefrom.

The parts are so proportioned that when the center of the segmental member 18 is about midway between the pinions 22 and 26, namely at about the axis of the main bar 1, the two posts 11 and 28 lie parallel to each other on the same side of that bar, as shown in Figs. 1 and 5. The axis about which the segmental member is adapted to swing lies outwardly beyond the ends of the stems 15 when the latter are fitted in their respective posts; thus permitting a bone to be located so that its long axis will be coincident with that axis. Thus, by providing the two stems with suitable means for effecting skeletal attachment with the bone on opposite sides of a fracture in the latter, one fragment of bone may be rotated relatively to the other, whenever necessary.

In the arrangement shown, the skeletal attachment means comprises pairs of sturdy screw-threaded pins 36; there being one of these pins extending through each end of each cross arm; the pins of each pair being shown as extending at right angles to their respective supporting arms. Each pin is held in place by a suitable set screw 37. The pins of each pair are symmetrically disposed with respect to the two axes about which each of the corresponding cross arms 29 can rock relatively to the post that supports the same. Thus, when the parts are in the positions illustrated in full lines in Figs. 1 and 5, each pair of bone-transfixing screws can be rocked to the right or to the left and be locked in any desired position. Furthermore, by loosening the set screws 14 that hold the stems 15 against rotation, the stems may be oscillated so that the four bone-transfixing screws no longer lie in the same plane; the dotted lines in Fig. 5 showing them swung through a considerable angle about the axis which is radial to the main supporting bar 1.

In using the device, it will be seen that the units for effecting skeletal attachment may be adjusted relatively from and toward each other by loosening the nuts 3 and 4 and shifting the unit that includes the sleeve 5 lengthwise of the bar 1; the nuts being then screwed up against the ends of the sleeve so as to hold the two units in proper spaced relation to each other. The parts of each unit may then be adjusted. For example, as shown in Fig. 2, the two pairs of bone-transfixing screws are no longer in the same planes but in more or less parallel planes in order that the screws of each pair may be in a plane registering approximately with the long axis of that fragment of a fractured bone which is to be manipulated thereby. In the case of the bone illustrated, the fragment A has dropped down below the fragment B, so that the axes of the two fragments are not aligned but are more or less parallel and spaced apart from each other. The screw-supporting arms 29 are therefore adjusted so that one is parallel with the axis of the fragment A, while the other is parallel to the axis of the fragment B. After the screws have been properly inserted in the bone-fragments, the nut 4 is backed off and the nut 3 is screwed against its end of the sleeve 5, so as to push the unit associated with this sleeve farther from the other unit and thus produce the necessary extension of the member containing the fractured bone. If rotation be desired, then the toothed segment may be shifted in the manner heretofore described. The screw-supporting arms 29 may be swung about the radial axes until the axes of the two bone fragments are brought into alignment. With the meeting ends of the bone fragments in proper registration with each other, all of the movable parts of the device are fixed in the positions which they then occupy and may then remain undisturbed, until the bone has knitted; there being no need to apply a cast to retain the bone fragments in their proper positions, because this can satisfactorily be done by the device itself. Of course, if it be desired to employ a cast and to remove the comparatively small, light supporting arm with its post elements, the screws holding the stems 15 in the tubular post may be loosened, so that the main supporting bar and the stem-carrying parts may be lifted off and leave only the immediate skeletal attaching devices on the patient.

It will thus be seen that I have produced a small, light, compact device which effectively serves all of the purposes of the usual apparatus that possesses many times its bulk and weight; my device possessing the important advantage over the older apparatuses that it may be worn by the patient until the bone has knitted, without requiring the application of a plaster cast for retention of the bone fragments. At the same time, if desired, the arm or leg that is being treated may be placed in a cast in the usual way.

It will be understood that the particular device illustrated and described represents simply the best form of the invention now known to me; and that the invention is not limited to the particular details so illustrated and described, but covers all forms coming within the definitions of my invention constituting the appended claims. I also wish to point out that while the word "sleeve" is used in the specification and claims for the sake of brevity, this word is intended to cover any small, light part as distinguished from a heavy cumbersome member that serves as a supporting base or foot for a fracture-reducing apparatus.

I claim:

1. An ambulatory splint and fracture reduction device consisting of a bar, a sleeve slidable on the bar and interlocked therewith so as to be held against rotation thereon, means on the bar to secure the sleeve in any desired position lengthwise of the bar, a tubular post projecting radially from the sleeve, a detachable stem rotatable in and projecting out of said post, a member mounted directly on one end of the said bar so as to be held against movement along the same and be adjustable about an axis parallel with and spaced apart from the bar and intersecting the axis of the aforesaid stem extended, a detachable stem mounted on said member so as to be radial to the said axis parallel to the bar and be rotatable about its own axis, cross arms pivoted at their middle to the outer ends of the stems, and bone-transfixing elements on the ends of each cross arm.

2. An ambulatory splint and fracture reduction device consisting of a bar, a sleeve slidable on the bar and interlocked therewith so as to be held against rotation thereon, means on the bar to move the sleeve along the bar and secure it in any desired position, a short tubular post projecting radially from the sleeve, a member mounted directly on one end of the said bar so as to be held against movement along the same and be adjustable about an axis parallel with and spaced apart from the bar and intersecting the axis of said post extended, detachable stems mounted in said post and on said member so as to be radial respectively to the bar and to the said axis parallel to the bar and each be rotatable about its own axis, a cross arm pivoted at its middle to the outer end of each stem for rocking movements about an axis at right angles, and bone-transfixing elements mounted on the ends of each cross arm so as to lie in the plane of the arm and its supporting stem and at about right angles to the arm.

3. An ambulatory splint and fracture reduction device consisting of a bar, a sleeve slidable on the bar and interlocked therewith so as to be held against rotation thereon, means on the bar to move the sleeve along the bar and secure it in any desired position, a short tubular post projecting radially from the sleeve, a member mounted directly on an end of the said bar so as to be held against movement along the same and be adjustable about an axis parallel with and spaced apart from the bar and intersecting the said post extended, a tubular post on said member radial to the last-mentioned axis, a detachable stem mounted in each post so as to be rotatable about its own axis, a cross arm pivoted at its middle to the outer end of each stem for rocking movements about an axis transverse to that stem, and bone-transfixing screws projecting outwardly from the ends of each arm at right angles to the latter and in about the plane of the cross arm and its stem.

4. An ambulatory splint and fracture reduction device consisting of a screw-threaded bar adapted to lie along a fractured limb and across the fracture and to be supported by the limb, a sleeve slidable on the bar and interlocked therewith so as to be held against rotation thereon, nuts on the bar at opposite ends of the sleeve to move the latter into and secure it in any desired position along the bar, a tubular post projecting radially from the sleeve, a detachable stem rotatable in and projecting beyond said post, a cross arm pivoted at its middle to the outer end of the stem, bone-transfixing pins secured to the ends of said cross arm and projecting therefrom in about the plane of the arm and stem, a head on one end of the said bar, an arc-shaped member mounted on said head so as to be adjustable about an axis parallel with and spaced apart from the bar and intersecting the said bone-transfixing pins, a second tubular post on and extending radially of said arc-shaped member, a detachable stem mounted in the said second post so as to be rotatable about its own axis, a second cross arm pivoted at its middle to the outer end of the latter stem and bone-transfixing element on the ends of the second cross arm.

5. An ambulatory splint and fracture reduction device consisting of a bar adapted to lie along a fractured limb and across the fracture and to be supported by the limb, a sleeve slidable on the bar and interlocked therewith so as to prevent relative rotary movements, means on the bar to move the sleeve along the same and hold it in any position into which it may be brought, a tubular, contractile post projecting radially from the sleeve, a stem extending axially into the post from the outer end of and rotatable in the latter, means to contract the post and clamp said stem against rotation, bone-engaging elements carried by said stem so as to project beyond the latter away from the bar and be adjustable thereon angularly about an axis at right angles thereto, a small head fixed on one end of the bar, a member mounted on said head so as to be held against movement lengthwise of the bar and be adjustable angularly about the axis of the fractured bone, a short, tubular post projecting from said member radial to the last-named axis, a second stem projecting from the latter post and rotatable therein, means to secure said second stem against rotation in its post, and bone-engaging elements carried by said second stem and adjustable thereon about an axis at right angles thereto.

6. In an ambulatory extension and reduction fracture apparatus, a supporting rod adapted to lie parallel to a fractured limb and across the fracture, a pin holding block secured to one end of the rod, a second pin holding block slidably secured on the rod, and means for positively moving said slidably mounted block away from the other block.

7. In an ambulatory extension and reduction fracture apparatus, a supporting rod adapted to lie parallel to a fractured limb and across the fracture, a pin holding block secured to one end of the rod, a second pin holding block slidably secured on the road, the securing means of each block providing movement of each block with respect to the rod in two mutually perpendicular axes.

8. In an ambulatory extension and reduction fracture apparatus, a supporting rod adapted to lie parallel to a fractured limb and across the fracture, a member slidably secured on said rod, a second member secured to one end of the rod, the securing means for said second member holding it against movement lengthwise of the rod and providing movement thereof angularly with respect to the rod, bone-engaging pins on each of said members, and means for positively moving the first of said members away from the second member.

9. In an ambulatory extension and reduction fracture apparatus, a supporting rod adapted to lie parallel to a fractured limb and across the fracture, a member slidably secured on said rod, a second member secured to one end of the rod, the securing means for said second member holding it against movement lengthwise of the rod and providing movement thereof angularly with respect to the rod about an axis parallel to and spaced apart from the rod, parallel stems, each rotatable about its own axis, projecting from said members on the same side and radially of the rod, and bone-engaging pins carried on said stems.

10. In an ambulatory extension and reduction fracture apparatus, a supporting rod adapted to lie parallel to a fractured limb and across the fracture, a member slidably secured on said rod, a second member secured to one end of the rod, the securing means for said second member holding it against movement lengthwise of the rod and providing movement thereof angularly with respect to the rod about an axis parallel to and spaced apart from the rod, parallel stems, each rotatable about its own axis, projecting from said members on the same side and radially of the rod, cross arms pivoted midway between their ends to the outer ends of said stems, and bone-engaging pins at opposite ends of each cross arm.

11. In an ambulatory extension and reduction fracture apparatus, a supporting rod adapted to lie parallel to a fractured limb and across the fracture, a member slidably secured upon the rod, a head on one end of the rod having a flat outer face positioned at right angles to the rod, a second member lying flat against said face, means securing the second member to the head and providing turning movements of that member relatively to the rod about an axis spaced apart from and parallel to the rod, and means including bone-engaging pins projecting from said members past said axis to secure the apparatus to the bone in the fractured limb.

12. In an ambulatory extension and reduction fracture apparatus, a supporting rod adapted to lie parallel to a fractured limb and across the fracture, a member slidably secured upon the rod, a head on one end of the rod having a flat outer face positioned at right angles to the rod, a second member lying flat against said face, said second member having therein an elongated slot forming an arc of a circle whose center is remote from said rod, a stationary guide element on said head projecting into said slot and engaged with one long edge of the latter, two pinions rotatably mounted on said head and extending into said slot on opposite sides of said guide element, the second long edge of the slot having teeth meshing with said pinions, means to turn one of said pinions, and means on said members, including bone-engaging pins, to secure the apparatus to the bone in the fractured limb.

13. In an ambulatory extension and reduction fracture apparatus, a supporting rod adapted to lie parallel to a fractured limb and across the fracture, a member slidably secured upon the rod, a head on one end of the rod having a flat outer face positioned at right angles to the rod, a second member lying flat against said face, said second member having therein an elongated slot forming an arc of a circle whose center is remote from said rod, a stationary guide element on said head projecting into said slot and engaged with one long edge of the latter, two pinions positioned in said slot on opposite sides of said guide element, means rotatably supporting one of said pinions on said head, means to turn the latter pinion, a clamping device for said second member including a screw extending into said head through and serving as a supporting element for the second pinion, the second long edge of the slot having teeth meshing with said pinions, and means on said members, including bone-engaging pins, to secure the apparatus to the bone in the fractured limb.

14. In an ambulatory extension and reduction fracture apparatus, a supporting rod adapted to lie parallel to a fractured limb and across the fracture, a member slidably secured on said rod, a second member secured to one end of the rod, the securing means for said second member holding it against movement lengthwise of the rod and providing movement thereof angularly with respect to the rod about an axis parallel to and spaced apart from the rod, parallel stems, each rotatable about its own axis, projecting from said members radially of the rod and toward said axis, and bone-engaging pins carried on said stems and extending past said axis.

JOE J. ETTINGER.